United States Patent
Lin

(10) Patent No.: US 8,254,114 B2
(45) Date of Patent: Aug. 28, 2012

(54) BATTERY COVER STRUCTURE FOR PORTABLE ELECTRONIC DEVICE

(75) Inventor: Jui-Hsiang Lin, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 411 days.

(21) Appl. No.: 12/651,558

(22) Filed: Jan. 4, 2010

(65) Prior Publication Data

US 2010/0290177 A1 Nov. 18, 2010

(30) Foreign Application Priority Data

May 15, 2009 (CN) .......................... 2009 1 0302376

(51) Int. Cl.
*H05K 5/00* (2006.01)
*H05K 7/00* (2006.01)

(52) U.S. Cl. .......... 361/679.56; 361/679.01; 361/679.58

(58) Field of Classification Search ............. 361/679.01, 361/679.56, 679.58
See application file for complete search history.

(56) References Cited

U.S. PATENT DOCUMENTS

| | | | | |
|---|---|---|---|---|
| 5,895,729 A * | 4/1999 | Phelps et al. | ..................... | 429/97 |
| 6,829,495 B2 * | 12/2004 | Lee | ............................. | 455/575.1 |
| 7,197,344 B2 * | 3/2007 | Ahn et al. | .................. | 455/575.1 |
| 7,274,554 B2 * | 9/2007 | Kang et al. | ............... | 361/679.01 |
| 7,751,181 B2 * | 7/2010 | Chen | ........................ | 361/679.01 |
| 7,855,884 B2 * | 12/2010 | Dong | ........................ | 361/679.58 |
| 7,916,477 B2 * | 3/2011 | Shen et al. | ............... | 361/679.58 |
| 8,027,157 B2 * | 9/2011 | Shen et al. | ............... | 361/679.58 |
| 2004/0192418 A1 * | 9/2004 | Nam | .......................... | 455/575.1 |
| 2008/0042448 A1 * | 2/2008 | Ge et al. | ........................ | 292/137 |
| 2010/0009247 A1 * | 1/2010 | Shi | ................................ | 429/100 |

* cited by examiner

*Primary Examiner* — Anthony Haughton
(74) *Attorney, Agent, or Firm* — Altis Law Group, Inc.

(57) ABSTRACT

A battery cover structure includes a removable cover, a button and a main body. The removable cover includes a locking portion and defines a receiving hole. The button includes an operating portion. The main body includes a latching portion and a recessed portion. The button is attached to the recessed portion. A curved arm is integrally formed with the main body and includes a contacting portion abutting the button. The latching portion is engaged with the locking portion and the operating portion is engaged in the receiving hole to lock the removable cover in the main body. The button is pressed down to detach the removable cover from the main body and return back by a rebounding force of the curved arm.

18 Claims, 6 Drawing Sheets

BATTERY COVER STRUCTURE FOR PORTABLE ELECTRONIC DEVICE

BACKGROUND

1. Technical Field

The present disclosure relates to portable electronic devices, particularly, to a battery cover structure for use in a portable electronic device.

2. Description of Related Art

Portable electronic devices such as mobile phones, personal digital assistants, etc., generally have main bodies and battery covers. A portable electronic generally includes a battery cover structure, which is used to attach the battery cover to the main body. A conventional battery cover structure includes a main body, a cover, a button and a spring. The button is attached to the main body, and the spring abuts the bottom of the button. The button may move relative to the main body under the role of the elastic force of the spring. The cover defines a through hole allowing the button to extend through, so as to lock the cover to the main body. The button and the spring are pressed down to attach or detach the cover to/from the main body. When the button is released, the spring rebounds to original shape and push the button to return back original position. However, the battery cover structure is complicated in structure. During disassembly, the button is susceptible to damage. Furthermore, the spring may deteriorate over time due to metal-fatigue, thus affecting the longevity of the battery cover structure.

Therefore, there is room for improvement within the art.

BRIEF DESCRIPTION OF THE DRAWINGS

Many aspects of the battery cover structure can be better understood with reference to the following drawings. The components in the drawings are not necessarily drawn to scale, the emphasis instead being placed upon clearly illustrating the principles of the battery cover structure, in which.

DETAILED DESCRIPTION OF THE EMBODIMENTS

Figure 1:
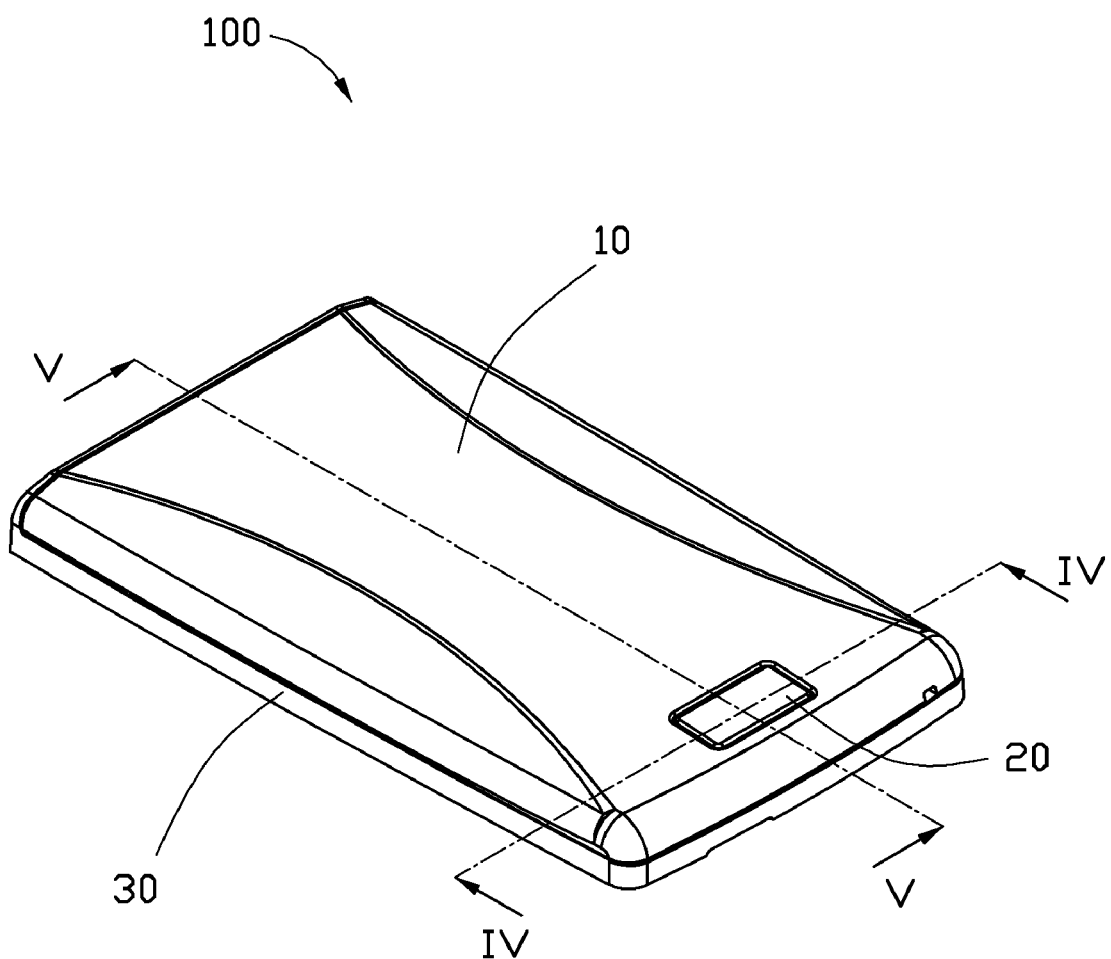
FIG. 1 is an assembled, schematic view of a battery cover structure, in accordance with an exemplary embodiment.
Figure 2:
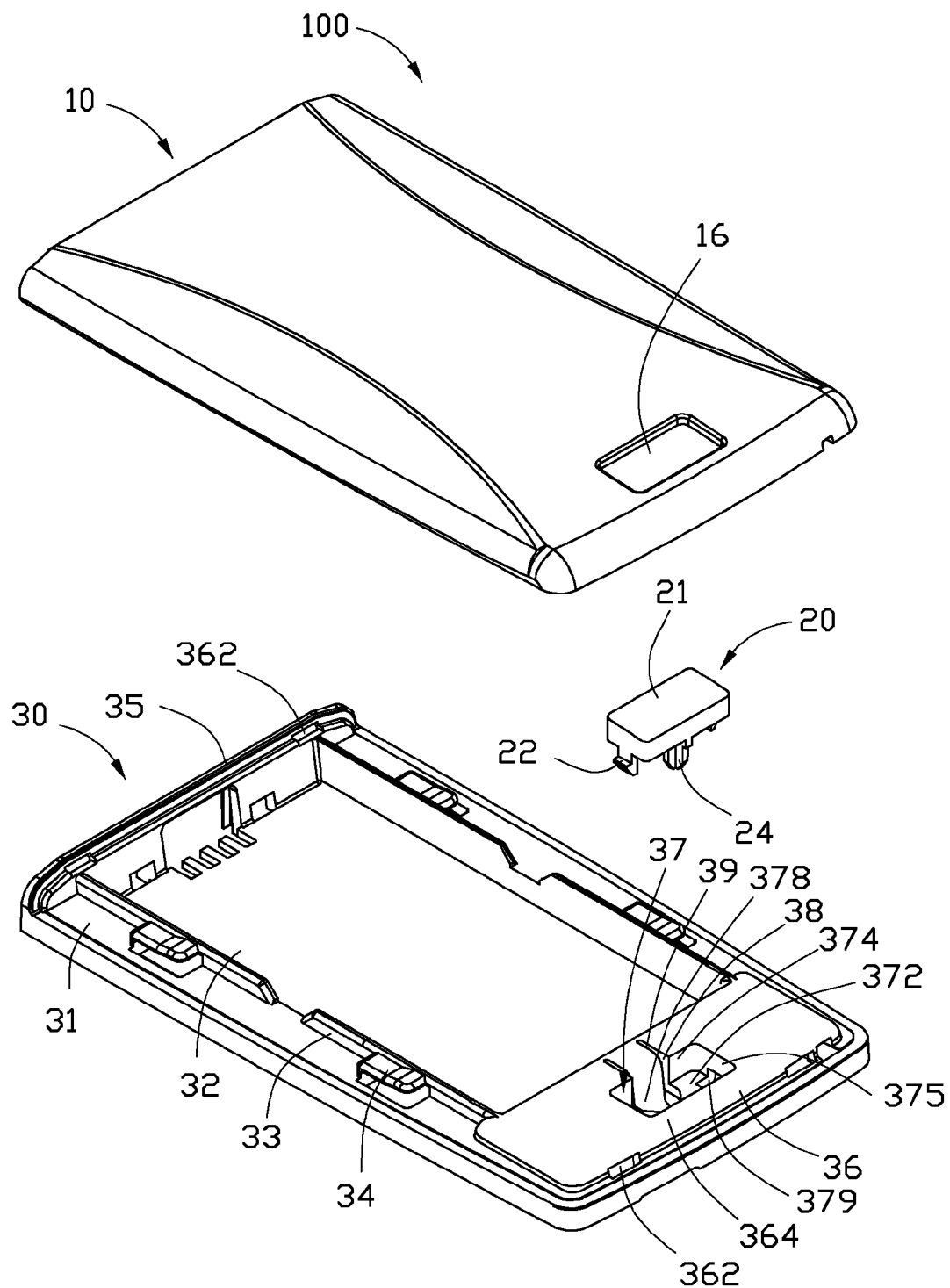
FIG. 2 is an exploded, schematic view of the battery cover structure showing in FIG. 1, the battery cover structure including a button.
Figure 3:
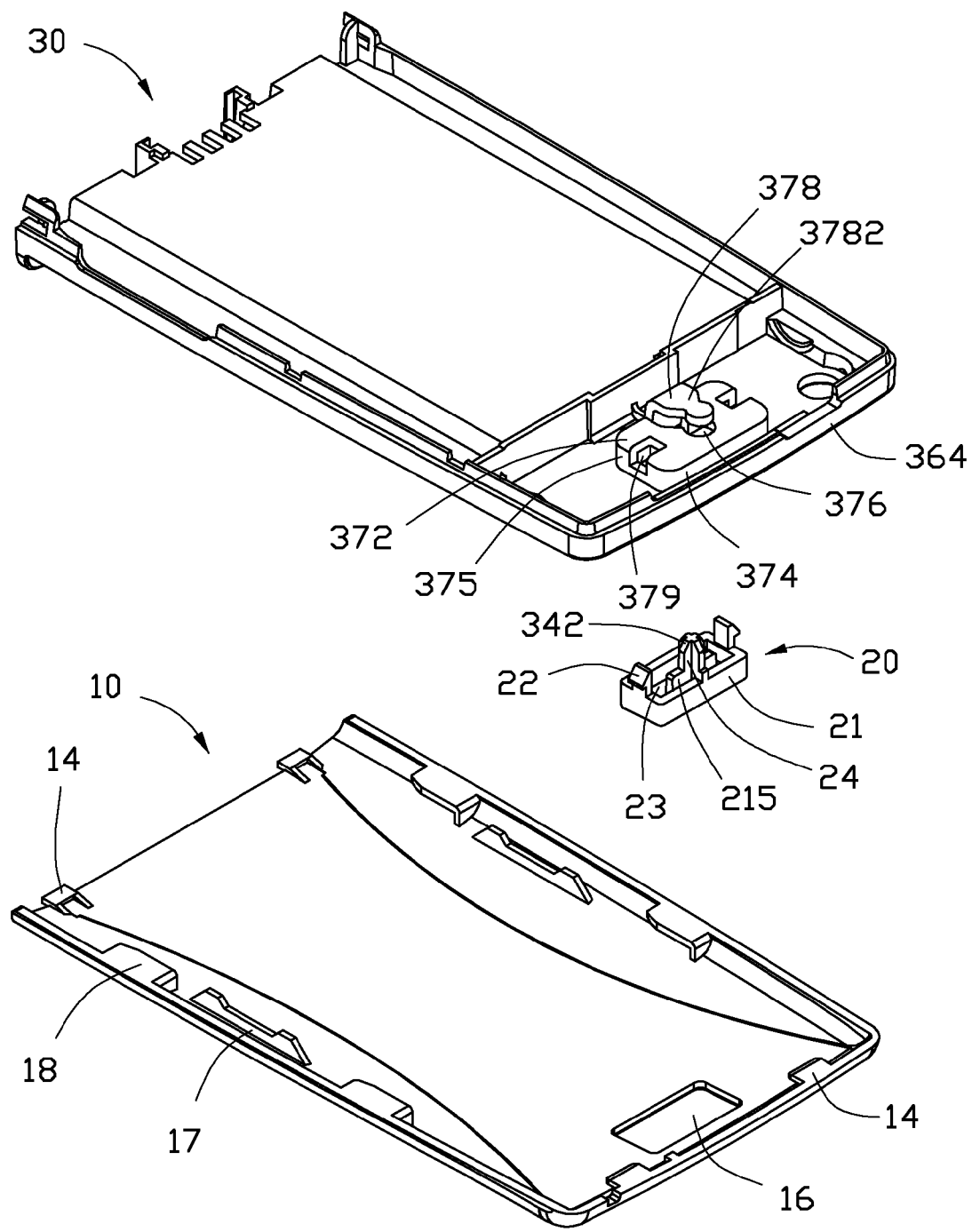
FIG. 3 is similar to FIG. 2, but showing another aspect.

FIGS. 1-3 show an exemplary embodiment of a battery cover structure 100 applied to a portable electronic device (not labeled). The battery cover structure 100 includes a removable cover 10, a button 20 and a main body 30.

The removable cover 10 includes, for example, two ledges 18 at each side and two tabs 14 at each end correspondingly. The removable cover 10 defines a through, receiving hole 16 at one end. The button 20 is extendible through the receiving hole 16. A bar 17 is formed between the two ledges 18 at each side of the removable cover 10.

The button 20 includes an operating portion 21 and two hooks 22 extending from corresponding opposite ends of the operating portion 21. The operating portion 21 defines a groove 23. A resisting portion 24 extends from a bottom surface of the groove 23. A plurality of ribs 215 are radially formed around the resisting portion 24 to strengthen the resisting portion 24. In this embodiment, the resisting portion 24 is generally a column and has an end portion 242, wherein the end portion 242 is generally a frustum of a cone. The resisting portion 24 is positioned at a middle portion of the operating portion 21, to balance the operating portion 21 when the button 20 is pressed down or pushed up. The hooks 22 and the resisting portion 24 are positioned at the same side of the operating portion 21, and the two hooks 22 extend in opposite directions.

The main body 30 includes a top surface 31 and defines a cavity 32 in the top surface 31 for receiving a battery (not shown). Rails 33 are respectively positioned at opposite sides of the cavity 32. The bars 17 are correspondingly slid along the rails 33 when the removable cover 10 is attached to the main body. A latch 34 protrudes from the top surface 31 adjacent to each rail 33, corresponding to the ledge 18 of the removable cover 10. The latches 34 are engaged with the corresponding ledges 18. The main body 30 further includes a first end portion 35 and a second end portion 36. Each end portion 35, 36 defines, for example, two slots 362 for respectively receiving the tabs 14 of the removable cover 10.

The second end portion 36 defines a recessed portion 37 in the top surface 31 for engaging with the button 20. The recessed portion 37 is surrounded by a bottom portion 372, two side walls 374 and two end walls 375. The bottom portion 372 defines a through hole 376. One of the side walls 374 defines a notch 38 communicating with the through hole 376. The second end portion 36 defines an opening 39 communicating with the notch 38, and a curved plate 378 extends in the opening 39, and further perpendicularly extends in the notch 38. Also referring to FIG. 5, the curved plate 378 includes a contacting portion 3782, a front portion 3786 and a middle portion 3784 connecting the contacting portion 3782 and the front portion 3786. The front portion 3786 extends from the top surface 31 and is received in the opening 39. The middle portion 3784 is received in the notch 38. The contacting portion 3782 beneath the bottom portion 372 is bent to be parallel to the bottom portion 372, for abutting the resisting portion 24 of the button 20 to provide a rebounding force on the button 20 when the button 20 is pressed down. The bottom portion 372 defines, for example, two locking holes 379 at two ends to allow the hooks 22 to extend through. Each locking hole 379 extends to the corresponding end wall 375. The distance between the two end walls 375 is shorter than that between the two hooks 22 of the button 20, so that the hooks 22 can be respectively locked by the end walls 375 through the locking holes 379.

Figure 4:
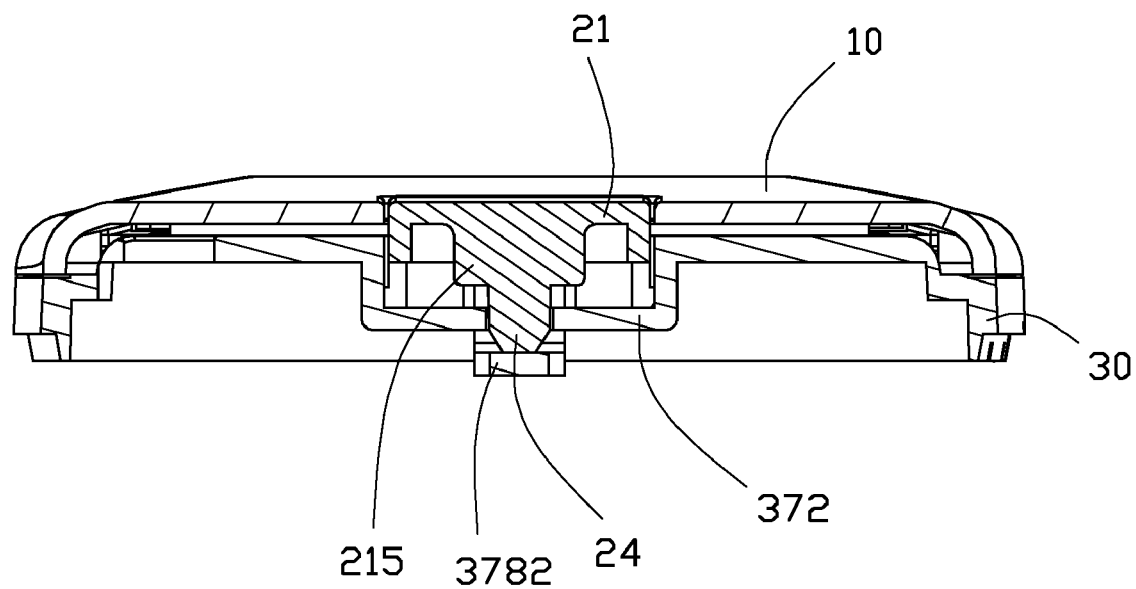
FIG. 4 is a cross-sectional view taken along line IV-IV of FIG. 1.
Figure 5:
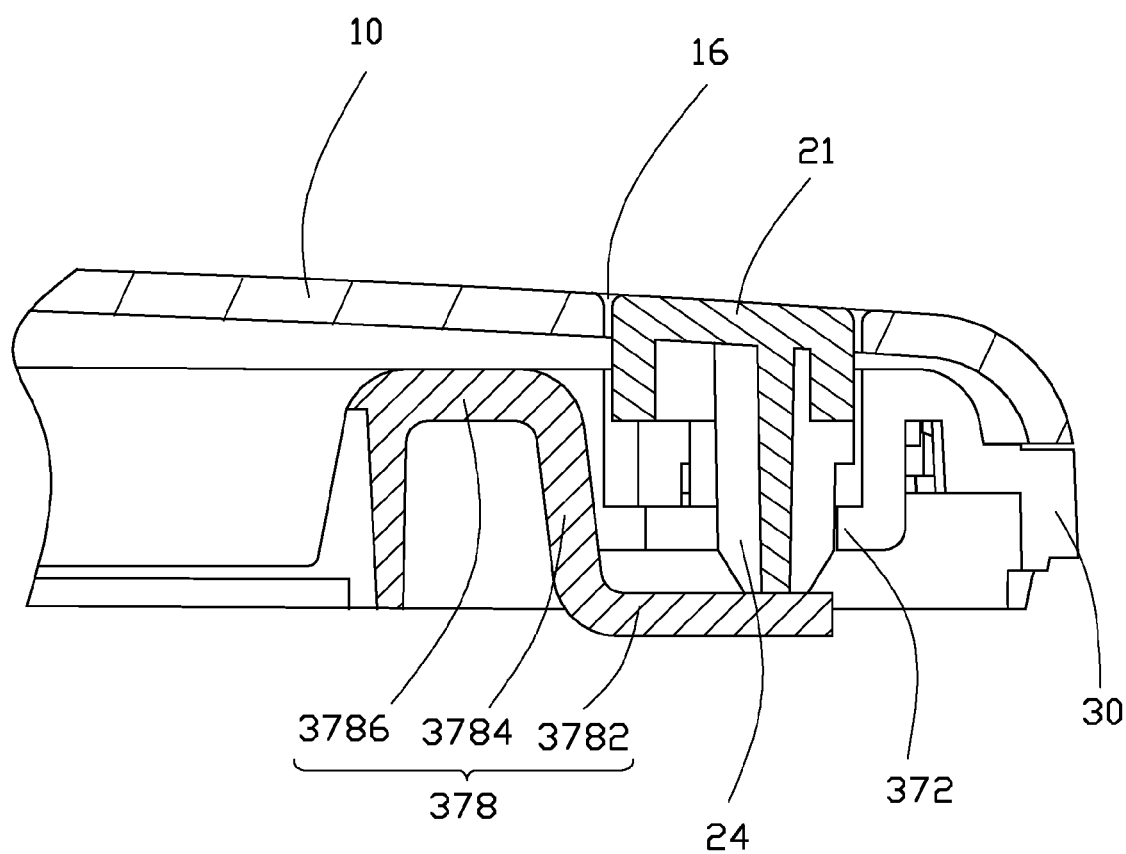
FIG. 5 is a partially, cross-sectional view taken along line V-V of FIG. 1, showing the button in an original position.

In assembly, also referring to FIGS. 4-5, the button 20 is received in the recessed portion 37, with the two hooks 22 abutting the two end walls 375. The two hooks 22 respectively extend through the locking holes 379, and then rebound to respectively engage with the end walls 375. The resisting portion 24 extends through the through hole 376 and abuts the contacting portion 3782 of the curved plate 378.

Figure 6:
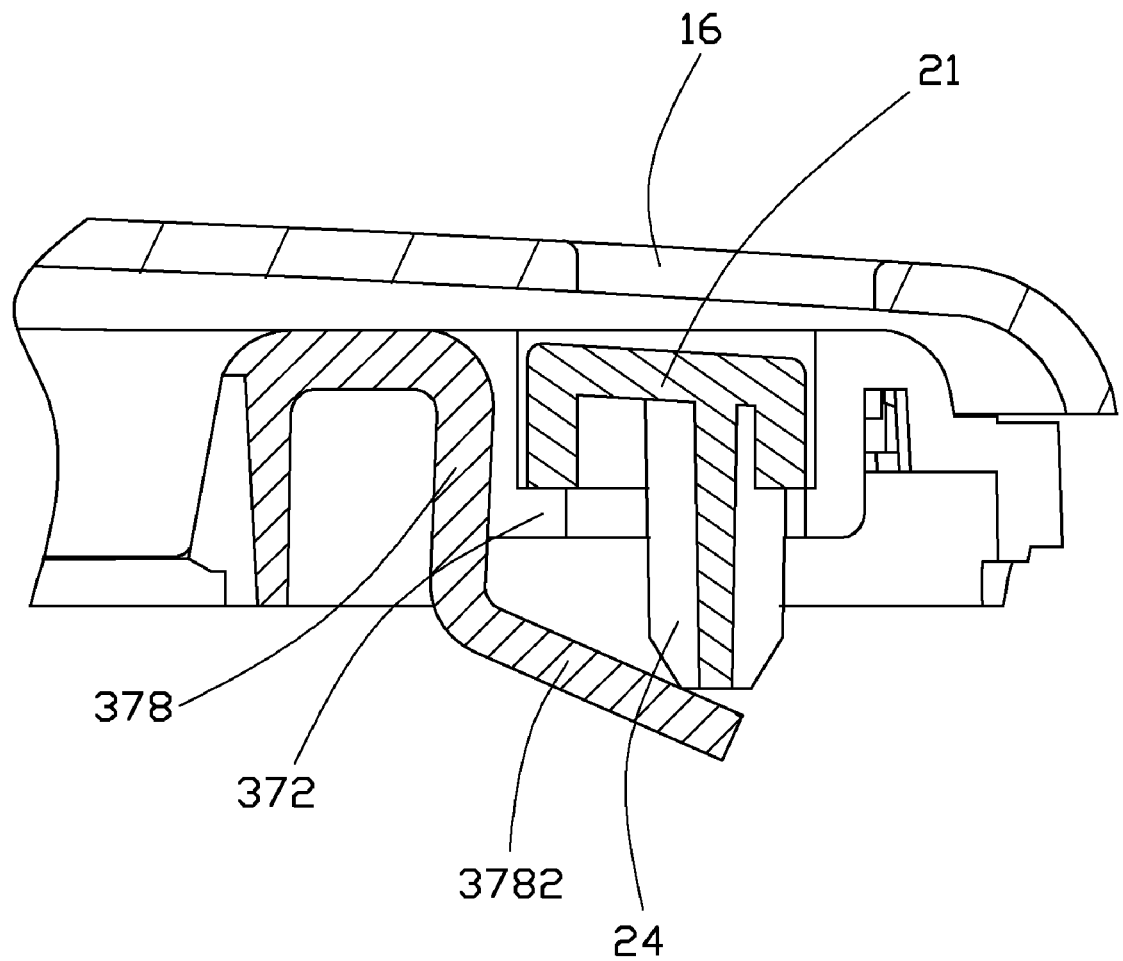
FIG. 6 is similar to FIG. 5, but showing the button is pressed down.

When the removable cover 10 is to be attached to the main body 30, also referring to FIG. 6, the button 20 is pressed down by the removable cover 10 to be moved out of the way, and the curved plate 378 is deformed. The removable cover 10 is pushed to slide toward the first end portion 35 of the main body 30. The bars 17 of the removable cover 10 respectively slide along the rails 33 of the main body 30, and the latches 34 of the main body 30 are respectively inserted into the ledges 18 of the removable cover 10. When the tabs 14 of the removable cover 10 are respectively engaged in the slots 362 of the main body 30, the button 20 is aligned with the receiving hole 16 of the removable cover 10. The button 20 is released, and then extends through the receiving hole 16 by a resilient/elastic force of the curved plate 378. The operating portion 21 of the button 20 is locked in the receiving hole 16 to prevent the removable cover 10 from moving.

When the removable cover 10 is to be detached from the main body 30, the button 20 is pressed down to be moved out of the way and the curved plate 378 is deformed. The removable cover 10 is pushed away from the first end portion 35 of the main body 30. The tabs 14 are respectively disengaged from the slots 362, and the latches 34 are respectively disengaged from the ledges 18. The button 20 is released and returns to original position by the rebounding force of the curved plate 378 when the removable cover 10 is moved from the main body 30.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover structure comprising:
   a removable cover including a locking portion and defining a receiving hole;
   a main body including a latching portion and a recessed portion; the latching portion being engaged with the locking portion; the recessed portion defining a through hole; a curved plate integrally formed with the main body and including a contacting portion beneath the through hole; and
   a button attached to the recessed portion; the button including an operating portion and a resisting portion, the operating portion being received in the receiving hole to prevent the removable cover from separating from the main body; the resisting portion extending through the through hole and abutting the contacting portion of the curved plate;
   wherein when the button is released from a pressed position, the curved plate returning to normal shape and forcing the button, wherein the curved plate includes a front portion and a middle portion substantially perpendicularly connecting the contacting portion and the front portion, wherein said contacting portion perpendicularly extends in a first direction from an edge of said middle portion and said front portion perpendicularly extends in a second direction opposite to said first direction from another edge of said middle portion to an original position.

2. The battery cover structure as claimed in claim 1, wherein the recessed portion defines two locking holes, and the button includes two hooks respectively engaging in the locking holes.

3. The battery cover structure as claimed in claim 2, wherein the resisting portion is positioned at a middle portion of the operating portion, and the two hooks are positioned at two ends of the operating portion.

4. The battery cover structure as claimed in claim 1, wherein the recessed portion is bounded by a bottom portion, two side walls and two end walls; the through hole is defined in the bottom portion, and one of the side wall defines a notch communicating with the through hole.

5. The battery cover structure as claimed in claim 4, wherein the main body comprises a top surface, the recessed portion is defined in the top surface; the top surface further defines an opening communicating with the notch, and the curved plate extends from the opening in the notch.

6. The battery cover structure as claimed in claim 5, wherein the contacting portion is beneath and bent to be parallel to the bottom portion; the curved arm further comprises a front portion and a middle portion, the front portion is received in the opening and the middle portion is received in the notch.

7. The battery cover structure as claimed in claim 1, wherein the locking portion comprises at least one ledge positioned at each side of the removable cover, and the latching portion comprises a corresponding latch positioned at each side of the removable cover for respectively engaging with the ledges.

8. The battery cover structure as claimed in claim 7, wherein the locking portion further comprises at least one tab positioned at each end of the removable cover, and the latching portion comprises corresponding slots in each end of the main body for respectively receiving the tabs.

9. The battery cover structure as claimed in claim 7, wherein a bar is positioned at each side of the removable cover, a rail is positioned at each side of the main body, and the bars respectively slide along the rails when the removable cover is attached to or detached from the main body.

10. The battery cover structure as claimed in claim 1, wherein the operating portion defines a groove, the resisting portion extends from a bottom surface of the groove, and a plurality of ribs are radially formed around the resisting portion and formed on the bottom surface of the groove to strengthen the resisting portion.

11. A portable electronic device comprising:
    a removable cover including a locking portion and defining a receiving hole;
    a button including an operating portion; and
    a main body including a latching portion and a recessed portion; the recessed portion defining a through hole; the button being attached to the recessed portion; a curved plate integrally formed with the main body abutting the button; the latching portion being engaged with the locking portion and the operating portion being engaged in the receiving hole to lock the removable cover in the main body; the button being pressed down to detach the removable cover from the main body and being forced to return to an original position by the curved plate;
    wherein the curved plate includes a contacting portion, a front portion and a middle portion substantially perpendicularly connecting the contacting portion and the front portion, the contacting portion is, wherein said contacting portion perpendicularly extends in a first direction from an edge of said middle portion and said front portion perpendicularly extends in a second direction opposite to said first direction from another edge of said middle portion beneath the through hole.

12. The portable electronic device as claimed in claim 11, wherein the button further comprises a resisting portion extending through the through hole to abut the contacting portion of the curved plate.

13. The portable electronic device as claimed in claim 11, wherein the recessed portion is bounded by a bottom portion, two side walls and two end walls; the through hole is defined in the bottom portion, the recessed portion defines two locking holes, the locking holes are defined in the bottom portion and one of the side wall defines a notch communicating with the through hole.

14. The portable electronic device as claimed in claim 13, wherein the main body comprises a top surface, the recessed portion is defined in the top surface; the top surface further defines an opening communicating with the notch, and the curved plate from the opening extends in the notch.

15. The portable electronic device as claimed in claim 14, wherein the contacting portion is bent to be parallel to the bottom portion; the front portion is received in the opening and the middle portion is received in the notch.

16. The portable electronic device as claimed in claim 15, wherein the recessed portion defines two locking holes in the bottom portion, each locking hole extends to the corresponding side wall, and the button includes two hooks respectively locked in the locking holes.

17. The portable electronic device as claimed in claim 12, wherein the operating portion defines a groove, the resisting portion extends from a bottom surface of the groove, and a plurality of ribs are radially formed around the resisting portion and formed on the bottom surface of the groove to strengthen the resisting portion.

18. A battery cover structure comprising:
a removable cover including defining a receiving hole;
a main body including a top surface and a recessed portion defined in the top surface; the recessed portion defining a through hole; the recessed portion bounded by a bottom portion, two side walls and two end walls; the through hole defined in the bottom portion, and one of the side wall defining a notch communicating with the through hole, the top surface further defining an opening communicating with the notch;
a curved plate integrally formed with the main body and including a contacting portion a front portion and a middle portion, the contacting portion being beneath and bent to be parallel to the bottom portion; the front portion being received in the opening and the middle portion being received in the notch; and
a button attached to the recessed portion; the button including an operating portion and a resisting portion, the operating portion being received in the receiving hole to prevent the removable cover from separating from the main body; the resisting portion extending through the through hole and abutting the contacting portion of the curved plate;
wherein when the button is released from a pressed position, the curved plate returning to normal shape and forcing the button to an original position.

* * * * *